US008707425B2

(12) United States Patent
Rathor et al.

(10) Patent No.: US 8,707,425 B2
(45) Date of Patent: Apr. 22, 2014

(54) SYSTEM, METHOD, AND COMPUTER PROGRAM PRODUCT FOR PREVENTING SCANNING OF A COPY OF A MESSAGE

(75) Inventors: Hirendra Rathor, Agra (IN); Muthu Nivas Hariharasubramanian, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1102 days.

(21) Appl. No.: 11/852,148

(22) Filed: Sep. 7, 2007

(65) Prior Publication Data

US 2013/0247131 A1    Sep. 19, 2013

(51) Int. Cl.
*G06F 11/00*    (2006.01)

(52) U.S. Cl.
USPC .............. 726/22; 726/23; 726/24; 709/223; 709/224; 709/225; 709/206

(58) Field of Classification Search
CPC ............ H04L 63/1416; H04L 63/1408; H04L 63/145; H04L 63/1441; H04L 63/1458
USPC ........................ 726/22–24; 709/223–225, 206
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,993,660 B1 * | 1/2006 | Libenzi et al. | 713/188 |
| 7,506,155 B1 | 3/2009 | Stewart et al. | |
| 2002/0120702 A1 * | 8/2002 | Schiavone et al. | 709/207 |
| 2006/0036690 A1 * | 2/2006 | O'Neil | 709/206 |
| 2007/0050444 A1 * | 3/2007 | Costea et al. | 709/202 |
| 2007/0083930 A1 * | 4/2007 | Dumont et al. | 726/24 |
| 2007/0180530 A1 * | 8/2007 | Verma et al. | 726/24 |
| 2008/0313733 A1 * | 12/2008 | Kramer et al. | 726/22 |

OTHER PUBLICATIONS

Microsoft Corporation, "Forefront Server Security User's Guide, Microsoft Forefront Server Security for Microsoft Exchange server 2007", Dec. 2006, pp. 1-205.*
Microsoft Corporation, "Forefront Server Security User's Guide", Dec., 2006, pp. 1-183.*
Dong-Her Shih et al., "Classification methods on the detection of new malicious emails", Jun. 8, 2004, pp. 241-261.*
"Forefront Security for Exchange Server 2007 User Guide," Microsoft TechNet, Microsoft Corporation, 2007 <http://www.microsoft.com/technet/forefront/serversecurity/exchange/userguide/default.mspx?mfr=true>.

* cited by examiner

*Primary Examiner* — Luu Pham
*Assistant Examiner* — Canh Le
(74) *Attorney, Agent, or Firm* — Patent Capital Group

(57) ABSTRACT

A system, method, and computer program product are provided for preventing scanning of a copy of a message. In use, it is determined whether an identifier of a message is stored in a data structure. Further, the scanning of a copy of the message is prevented, based on the determination.

20 Claims, 7 Drawing Sheets

SYSTEM, METHOD, AND COMPUTER PROGRAM PRODUCT FOR PREVENTING SCANNING OF A COPY OF A MESSAGE

FIELD OF THE INVENTION

The present invention relates to scanning messages, and more particularly to scanning messages for predetermined content.

BACKGROUND

Traditionally, scanning systems have been utilized for scanning data for predetermined data. For example, such predetermined data has oftentimes included data predetermined to be unwanted (e.g. malware, etc.). In various frameworks, it is desirable to scan data in the form of messages in the context of a messaging system. However, scanning systems have often exhibited inefficiencies when scanning such messages.

For example, when an outgoing message is sent to a destination, a copy of such message is sometimes stored as a sent message. Thus, the outgoing message and the copy of the message have the same content. However, message scanning systems have generally scanned both outgoing messages and sent messages. As a result, such message scanning systems typically perform redundant scanning, which can needlessly utilize limited resources, etc.

There is thus a need for addressing these and/or other issues associated with the prior art.

SUMMARY

A system, method, and computer program product are provided for preventing scanning of a copy of a message. In use, it is determined whether an identifier of a message is stored in a data structure. Further, the scanning of a copy of the message is prevented, based on the determination.

DETAILED DESCRIPTION

Figure 1:
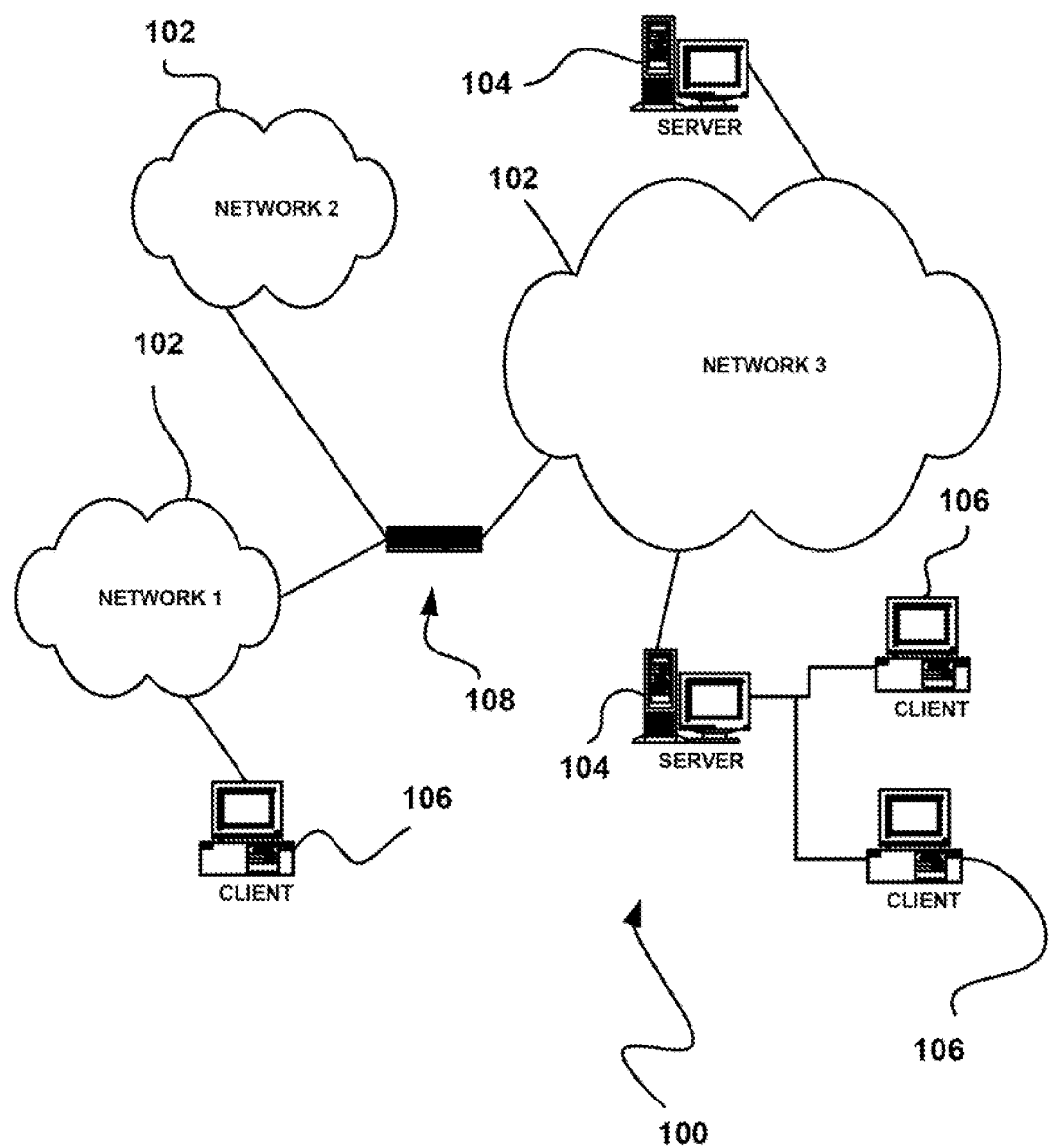
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
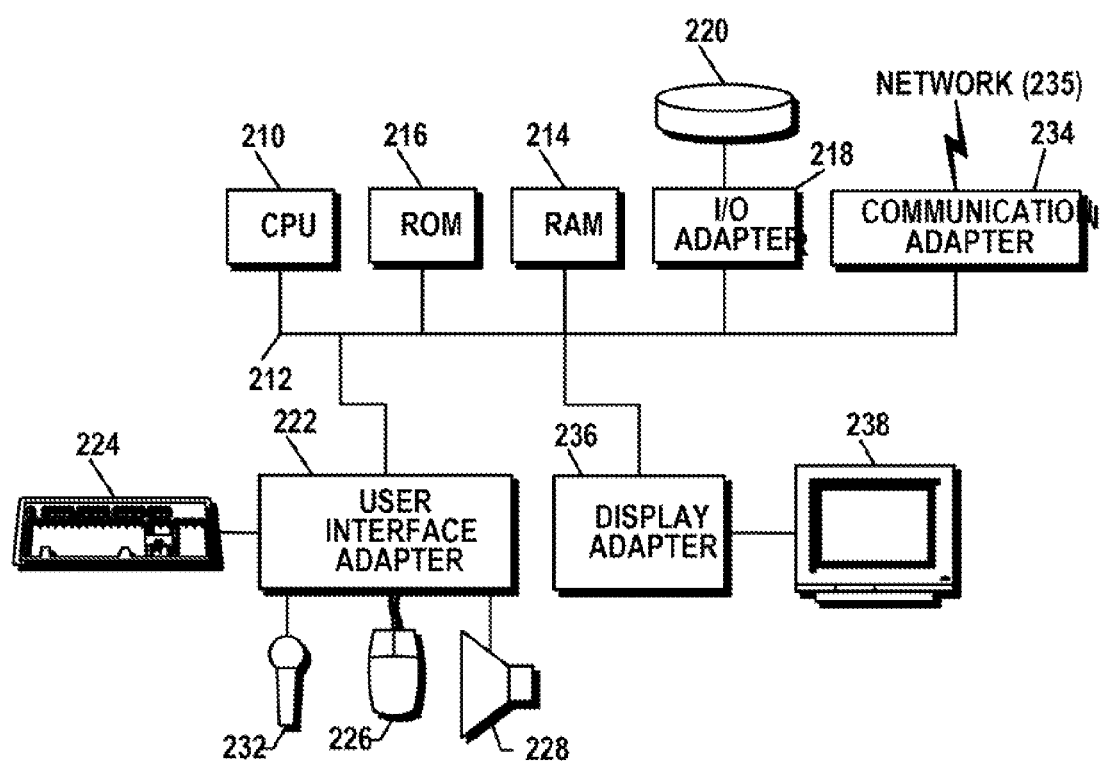
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
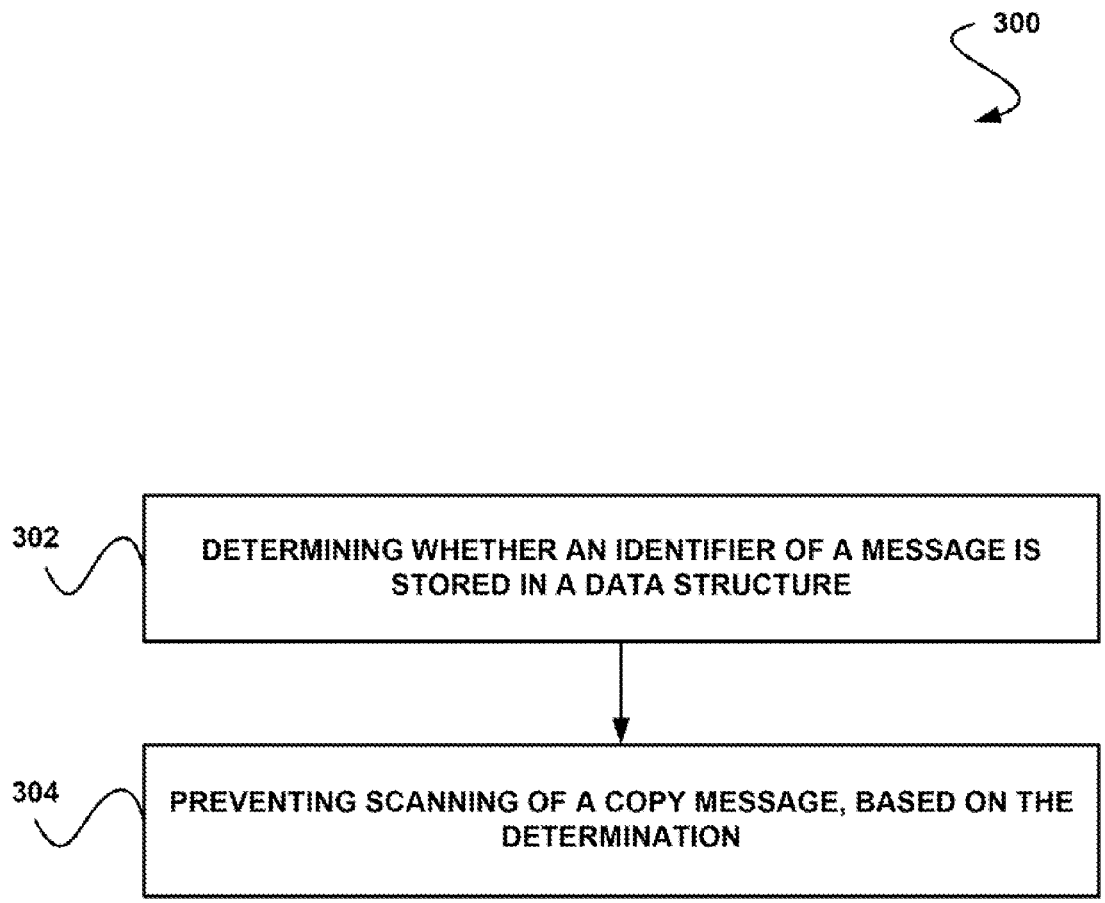
FIG. 3 shows a method for preventing scanning of a copy of a message, in accordance with one embodiment.

FIG. 3 shows a method 300 for preventing scanning of a copy of a message, in accordance with one embodiment. As an option, the method 300 may be carried out in the context of the architecture and environment of FIGS. 1 and/or 2. Of course, however, the method 300 may be carried out in any desired environment.

As shown in operation 302, it is determined whether an identifier of a message is stored in a data structure. In the context of the present description, the message may be an outgoing electronic mail message (e.g. a message being sent from a first location to a different second location, etc.), a sent electronic mail message (e.g. stored with respect to a mail application as a copy of an outgoing electronic mail message, etc.), a draft of an electronic mail message, a copy of a message being archived and/or any other type of message capable of being identified. For example, in one embodiment, the message may be an electronic mail message created in a mail server mailbox. Of course, the messages may take on absolutely any format including, but not limited to POP3, SMTP, instant messaging (IM), etc.

Additionally, the identifier (ID) of the message may include any information, content, etc. which identifies the message. In one embodiment, the identifier may include the header of the message or a portion of the header of the message. In another embodiment, the identifier may include a file name of the message. Additionally, in yet another embodiment, the identifier may include a hash of a portion of the message. Furthermore, in still another embodiment, the identifier may be part or all of a body of the message.

Additionally, the data structure may include any structure capable of storing message identifiers. In one embodiment, the data structure may be a list. In another embodiment, the data structure may be a database. Further, in yet another embodiment, the data structure may be a table. Also, in still another embodiment, the data structure may be a block of memory and/or a pool of data entries. For example, the data structure may include a cache.

As an option, the data structure may store message identifiers for messages that have been scanned. For example, an identifier of a message may be stored in the data structure, in response to a scan of such message. In this way, the data structure may indicate scanned messages.

Furthermore, it may be determined whether the identifier of the message is stored in the data structure in any manner. For example, the identifier of the message, or any portion of the identifier, may be compared to one or more identifiers stored in the data structure. In another embodiment, the identifier of the message may be determined to be stored in the data structure if the identifier of the message matches an identifier stored in the data structure.

Furthermore, as shown in operation 304, scanning a copy of the message is prevented based on the determination. In the context of the present description, the scanning may refer to any type of scanning. Optionally, performance of the scanning (based on the determination) may be with respect to a body and/or an attachment of the message. For example, the scanning may include virus scanning, data loss prevention scanning, data content scanning, etc. In one embodiment, the scanning may include determining one or more actions to be performed on the copy of the message.

In addition, the copy of the message may include any duplicate, reproduction, etc. of the message. In one embodiment, the copy of the message may or may not be an exact copy of the message. In another embodiment, the copy of the message may contain the same content as the message. For example, the copy of the message may be a copy of an electronic mail message created in a user's mailbox. In another example, the copy of the message may contain the same body and attachments as the message. In yet another embodiment, the copy of the message may include a sent electronic mail message, an outgoing electronic mail message, etc.

In one embodiment, the scanning of the copy of the message may be prevented if it is determined that the identifier of the message is stored in a data structure. For example, determining that the identifier of the message is stored in the data structure may indicate that the message has been scanned. Thus, scanning a copy of such message may be prevented, for efficiency purposes.

As an option, the determination of whether the identifier of the message is stored in the data structure (operation 302) may be responsive to a request to access, create, or update the copy of the message. Thus, scanning the copy of the message based on such access request (e.g. utilizing an on-access scan) may be prevented if it is determined that the identifier of the message is stored in a data structure. As another option, the determination of whether the identifier of the message is stored in the data structure may be responsive to a request for creation or modification of the copy of the message. Of course, as still another option, the determination of whether the identifier of the message is stored in the data structure may be responsive to a request for an on-demand scan (e.g. associated with a user selection for such scan, etc.). Accordingly, scanning the copy of the message based on such request for the on-demand scan may be prevented if it is determined that the identifier of the message is stored in a data structure.

Also, the scanning of the copy of the message may be prevented in any manner. For example, the copy of the message may be prevented from being placed in a queue of messages to be scanned. As another example, scanning of the copy of the message may be blocked.

As yet another example, a scan action may be retrieved from the data structure. Such scan action may include any actions (e.g. delete message, quarantine message, clean message, etc.) performed on the message during and/or as a result of a scan of such message. Optionally, the scan action may be stored in the data structure in association with the identifier of the message, but of course may be stored in a second data structure separate from the data structure in which the message identifiers are stored. Further, preventing the scanning of the copy of the message may further include applying the scan action to the copy of the message (in reliance of the results of a previous scan).

In another embodiment, the copy of the message may be scanned if it is determined that the identifier of the message is not stored in the data structure. For example, determining that the identifier of the message is not stored in the data structure may indicate that the message has not yet been scanned, such that a scan action has not been performed on the message as a result of a scan. Thus, the copy of the message may be scanned for determining any scan actions to be performed on such copy of the message.

Figure 4:
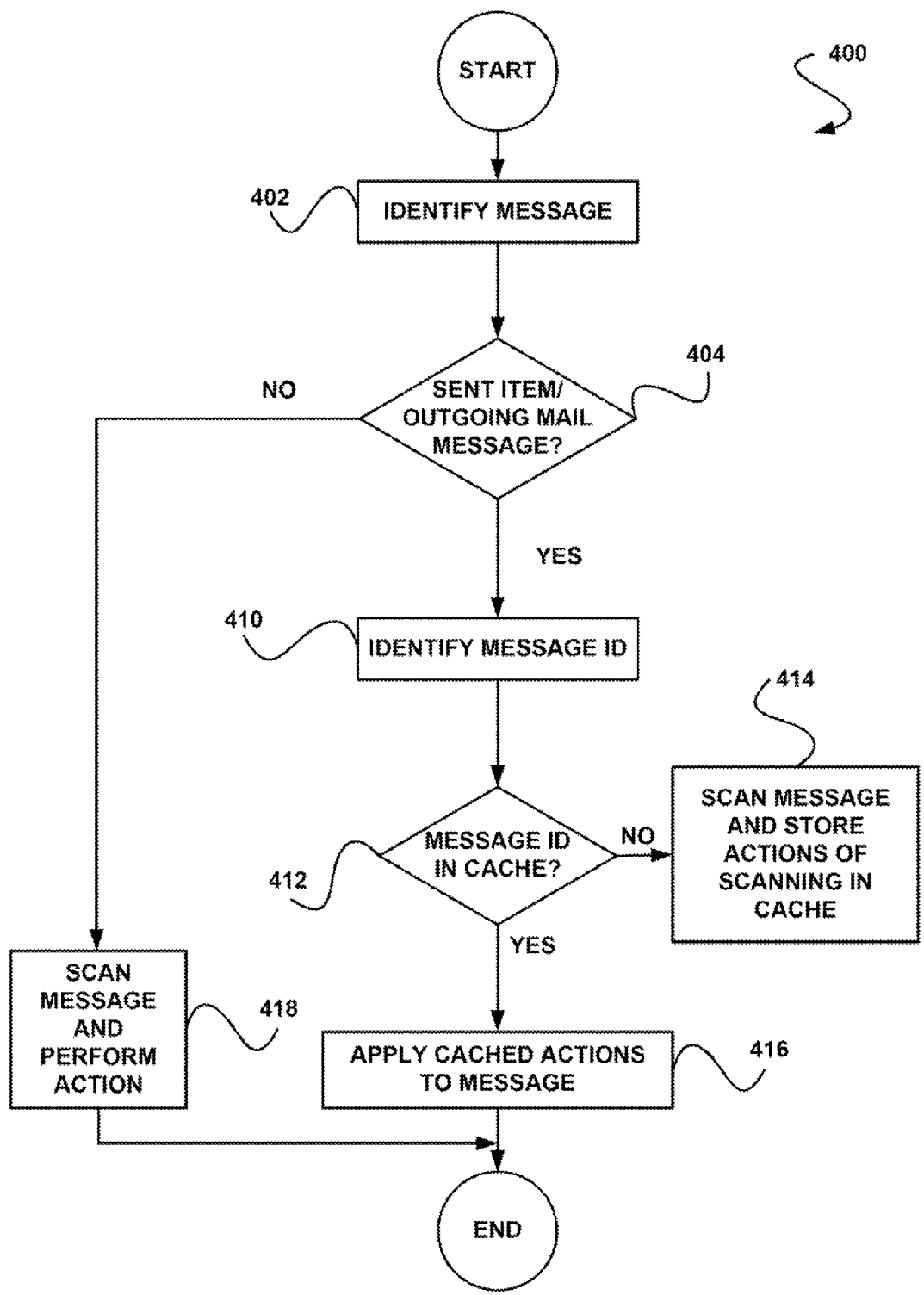
FIG. 4 shows a method for preventing scanning of a copy of a message, based on an identifier of the message, in accordance with another embodiment.

FIG. 4 shows a method 400 for preventing scanning of a copy of a message based on an identifier of the message, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a message is identified. As an option, the message may include any message capable of being identified. For example, the message may include a message capable of being communicated from a first location to a second location (e.g. over a network, etc.). As an option, the message may include the message described above in the context of operation 302 of FIG. 3.

In addition, it is determined whether the message is a sent item or an outgoing mail message. See decision 404. In the context of the present embodiment, the sent item may be any message relating to a sent message. For example, the sent item may be a copy of an outgoing electronic mail message.

Additionally, in one embodiment, the sent item may be created and/or stored in a user's electronic mailbox. For example, the sent item may be stored in a sent mail folder of the user's electronic mailbox. Thus, the identified message may be determined to be a sent item if such message is stored in a sent mail folder.

In another embodiment, the sent item may have a header representing addresses to which the associated outgoing message was sent and/or a header storing the date and/or time when the associated outgoing message was posted for sending. In addition, the sent item may not necessarily have a header storing the date and/or time when the associated outgoing message was delivered to a destination electronic mailbox. To this end, the identified message may be determined to be a sent item based on a header of such identified message. In yet another embodiment, the sent item may be different from a message draft in the user's electronic mailbox.

Further, the outgoing mail message may be any type of mail message that is outgoing. For example, the outgoing mail message may be a pending electronic mail message (e.g. pending for delivery, etc.). In one embodiment, the outgoing mail message may be a message created in a server's electronic mailbox. In addition, the outgoing mail message may be identified based on its contents. For example, when a message travels across the Internet, a mail transfer agent may append information regarding its mail domain to contents of the message, and when the message reaches its destination, it may contain a list of all the mail domains through which the message has traveled.

Additionally, in another example, a mail server may add domain information to the outgoing mail message when it travels through one or more private networks and/or the Internet. As a result, an outgoing mail message which does not contain a list of domains may be construed as originating from the mail server. In still another example, if a message is scanned in the server's electronic mailbox and is determined to not have a header for any domains through which it has traveled, the message may be identified as an outgoing mail message.

If it is determined in decision 404 that the message is not a sent item or an outgoing mail message, the message is scanned and one or more actions are performed. See operation 418. For example, it may be determined that the message is a draft. As an option, the message scanning may include the scanning described above with respect to operation 304 of FIG. 3. In one embodiment, the message may be scanned utilizing a scanning system (e.g. an anti-virus scanner, etc.)

In addition, the actions may include any actions that may be performed with respect to a message. In one embodiment, the actions may include allowing the message to sent, stored, accessed, etc. In another embodiment, the action may include deleting the message.

Furthermore, in yet another embodiment, the action may include cleaning one or more items (e.g. attachments, text, body, etc.) within the message. In still another embodiment, the action may include deleting any of such items within the message. Also, in another embodiment, the action may include replacing the items within the message with an alert message. As an option, such alert message may be configured by a user.

If it is determined in decision 404 that the message is a sent item or an outgoing mail message, then in operation 410 a message identifier (message ID) of the message is identified. In one embodiment, the message ID may be machine readable and not meaningful to humans. In another embodiment, the message ID may be unique to the message. Optionally, revisions to the message may each receive a new message ID.

Additionally, in yet another embodiment, the uniqueness of the message ID may be guaranteed by the host that generates the message ID. Further, in another embodiment, unique message ID may be created for messages which are not routed through the Internet. In still another embodiment, the message ID may be used for keeping track of one or more conversations and/or a read status of the message. Further still, in another embodiment, the message ID may be the same for a sent item associated with an outgoing mail message.

Further still, the message ID may be identified in any desired manner. For example, the message ID may be identified by reading a header of the message. In another embodiment, the message ID may be identified by hashing the message.

Furthermore, in decision 412 it is determined whether the message ID is stored in a cache. As an option, the cache may include the data structure described above with respect to operation 302 of FIG. 3. In one embodiment, the cache may be a block of memory containing message IDs. In another embodiment, the message IDs may each correspond to an outgoing mail message. In addition, the determination of whether the message ID is stored in the cache may be made in the manner illustrated in operation 302 of FIG. 3. Of course, however, the determination may be made in any desired manner.

If it is determined in decision 412 that the message ID is not stored in the cache, then in operation 414 the message is scanned and actions of the scanning are stored in the cache. For example, the actions may include deleting the message, quarantining the message, cleaning the message, etc. Further, the actions may be stored in the cache in association with the message ID.

Of course, in another embodiment (not shown), the actions of the scanning may be stored in a second data structure separate from the cache. For example, the second data structure may include a mapping table that maps message IDs to scan actions performed on associated messages. To this end, the actions of the scanning may be stored by being mapped to the message ID of the scanned message. For example, the second data structure may store one or more mappings between the message ID and the actions of the scanning.

If it is determined in decision 412 that the message ID is stored in the cache, then in operation 416 one or more cached actions are applied to the message. For example, cached actions mapped to the message ID may be performed on the message. In the context of the present embodiment, the cached actions may be any actions which are capable of being applied to the message. In one embodiment, the cached actions may be scan actions. For example, the cached actions may include cleaning an attachment or body of the message, deleting the message, deleting the attachment or body of the message, replacing the attachment or body of the message with an alert, etc.

Figure 5A:
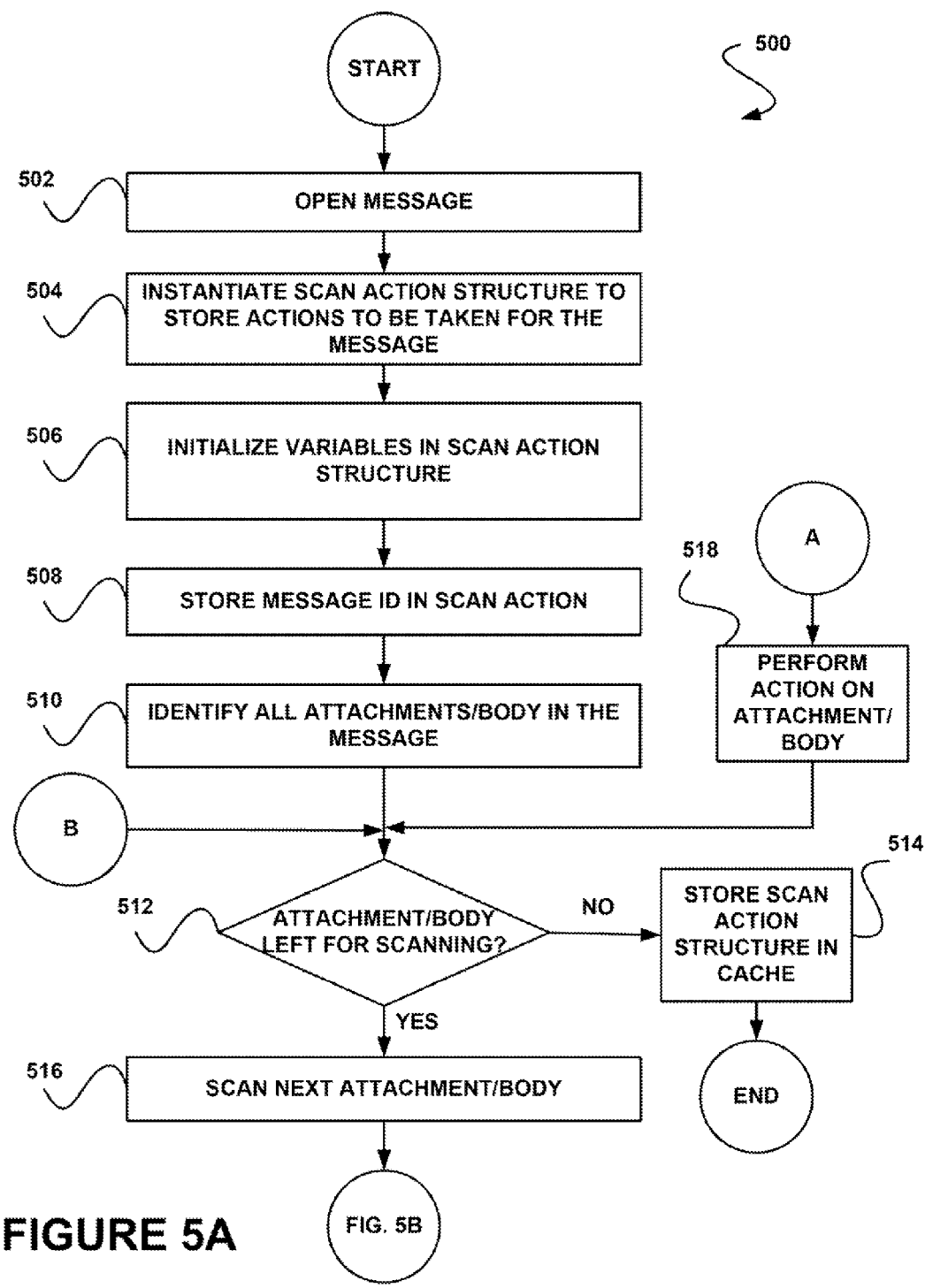
FIGS. 5A-B show a method for storing actions of scanning a message in a cache, in accordance with yet another embodiment.
Figure 5B:
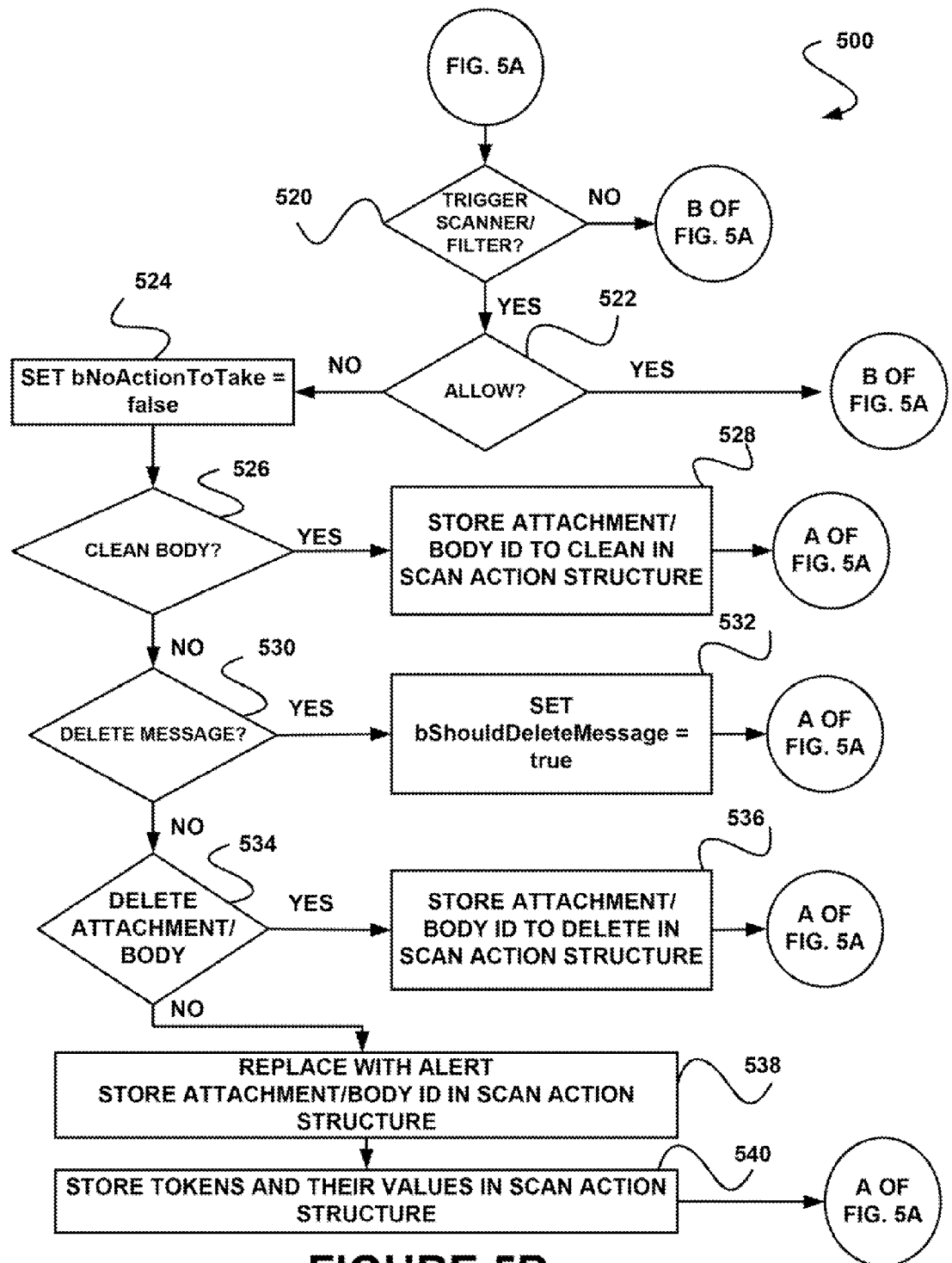

FIGS. 5A-B show a method 500 for storing actions of scanning a message in a cache, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, a message is opened. In one embodiment, the message may be opened by accessing one or more of the body, header, attachments, etc. of the message. For example, the access may include reading, displaying, copying, etc. the message. However, the message may be opened in any manner. In another embodiment, the message may be opened by reading the message in preparation of scanning data in the message.

Additionally, a scan action structure is instantiated to store actions to be taken for the message. See operation 504. In one embodiment, the scan action structure may be a data structure capable of storing actions to be performed on the message. In another embodiment, the scan action structure may contain one or more variables, flags, indicators, etc. In still another embodiment, the actions may include one or more cached actions as described in operation 416 of FIG. 4.

Additionally, in operation 506, variables in the scan action structure are initialized. In one embodiment, the variables may include indicators as to what actions need to be performed on the message as a result of a scanning of the message. For example, the variables may include a bNoAction-ToTake flag which indicates that, if "true," scanning of the message may be prevented. In another example, the variables may include a bShouldDeleteMessage flag that, if "true," indicates that the message should be deleted.

Furthermore, in yet another embodiment, the variables may include an index of the body and/or one or more attachments of the message to be scanned, even if scanned previously, and/or deleted, replaced, etc. with one or more alert messages. In still another embodiment, the variables may include a set of tokens. Of course, however, the variables may include any data regarding one or more actions to be taken for the message.

Also, the variables in the scan action structure may be initialized in any manner. In one embodiment, the variables may all be set at a default value. For example, any flags in the scan action structure may be given a predetermined "true" or "false" value.

Additionally, in operation 508 a message ID of the message is stored in the scan action. In one embodiment, the message ID may be mapped to/correlated with the scan action structure. In another embodiment, the message ID may be stored as a variable in the scan action structure.

Further, as shown in operation 510, all the attachments and the body of the message are identified. In one embodiment, the body and each attachment in the message may be individually scanned. Further still, in decision 512, it is determined whether the body or any attachments are left for scanning. If in decision 512 the body is not left for scanning and no attachments are left for scanning, in operation 514 the scan action structure is stored in a cache. For example, the scan action structure may be stored in cache in association with the message ID.

If in decision 512 the body or any attachments are left for scanning, then the next attachment or the body is scanned. Note operation 516. In one embodiment, the next attachment or the body may be the next available attachment or the body which has not yet been scanned. For example, if a message contains multiple attachments and a body, and the body and only some of the attachments have been scanned, then the next available attachment will be scanned in the message.

Furthermore, as shown in decision 520, it is determined whether a scanner and/or a filter are triggered. In one embodiment, the scanner/filter may be triggered when it is determined that an action is to be performed based on the scanning of the attachment/body of the message. Just by way of example, the scanner/filter may be triggered in response to an identification of unwanted data in the message. In yet another embodiment, the scanner/filter may not be triggered when it is determined that the attachment/body of the message is clean based on the scanning, such that no action is to be performed based on the scanning of the attachment/body.

If in decision 520 the scanner/filter is not triggered, then it is again determined whether the body or any attachments are left for scanning (operation 512). If in decision 520 the scanner/filter is triggered, then in decision 522 it is determined whether a current item of the message (e.g. body or attachment of the message) that was scanned is allowed. In one embodiment, allowing the current item may include not performing an action on the current item. In another embodiment, the determination may be automatic. For example, a default action may automatically allow a particular attachment or body that meets predefined criteria. In yet another embodiment, the determination may be based on the content of the current item. For example, the action to be performed on the current item may be automatically exempted based on the content of the current item.

If in decision 522 the current item that scanned is allowed, it is again determined whether the body and/or any attachments are left for scanning (note operation 512). For example, if the body of the message is allowed, it may next be determined whether the message contains any attachments to scan.

If in decision 522 the current item that was scanned is not allowed, then in operation 524 the variable bNoActionToTake is set to false. In one embodiment, setting the variable may be an automatic action. In this way, it is noted that an action is to be taken with respect to the message.

In addition, in response to operation 524, in decision 526 it is determined whether the current item that was scanned needs to be cleaned. For example, scanning the current item may result in the discovery of a virus. Thus, cleaning die current item may include removing a virus If it is determined in decision 526 that the body or attachment needs to be cleaned, then in operation 528 an ID of the current item that needs to be cleaned is stored in the scan action structure. Further, in response to operation 528, the action is performed on the current item, as shown in operation 518. For example, current item may be cleaned. In one embodiment, the cleaned current item may be stored for later use. For example, the cleaned current item may be stored in a cache and may be mapped to the ID of the current item in the scan action.

If it is determined in decision 526 that the body or attachment does not need to be cleaned, then in decision 530 it is determined whether the message should be deleted. For example, the results of the scanning of the current item may indicate that the entire message should be deleted. Optionally, such message deletion may be a result of a determination that the current item that is scanned contains a virus, and that a fix, patch, solution, etc. is unavailable for the virus.

If it is determined in decision 530 that the message needs to be deleted, in operation 532 the variable bShouldDeleteMessage is set to true in the scan action structure. In this way, it is noted that the entire message should be deleted. For example, if a message with multiple attachments contains one known infected attachment, an administrative policy may dictate that the entire message be deleted. Further, in response to operation 532, the action is performed on the current item in operation 518. For example, in operation 518 the message may be deleted.

If it is determined in decision 530 that the message should not be deleted, then in decision 534 it is determined whether the current item should be deleted. For example, it may be determined that one attachment in the message is corrupt or infected with a virus, whereas other attachments in the message are not infected. If it is determined in decision 534 that the current item should be deleted, in operation 536 the ID of the current item to be deleted is stored in the scan action structure. Further, in response to operation 536, the action is performed on the current item in operation 518. For example, in operation 518 the current item may be deleted.

In addition, if it is determined in decision 534 that the body or attachment should not be deleted, then in operation 538 it is noted that the current item should be replaced with an alert, and the ID of the current item is stored in the scan action structure. The alert may be a configured alert message, a custom message, a notification program, and/or any other type of alert. In one embodiment, the current item that is replaced by with the alert may be temporarily stored at a predetermined location.

Additionally, in response to operation 538, one or more tokens and their values are stored in the scan action structure, as shown in operation 540. In one embodiment, the tokens may contain corresponding values for the body and every attachment in the message. In another embodiment, the tokens may contain message sender information, recipient information, body text, etc. Of course, however, the tokens may contain any message-related information. Further, in response to operation 540, the action is performed on the body or attachment in operation 518. For example, in operation 518 the body or attachment may be replaced with an alert.

Figure 6:
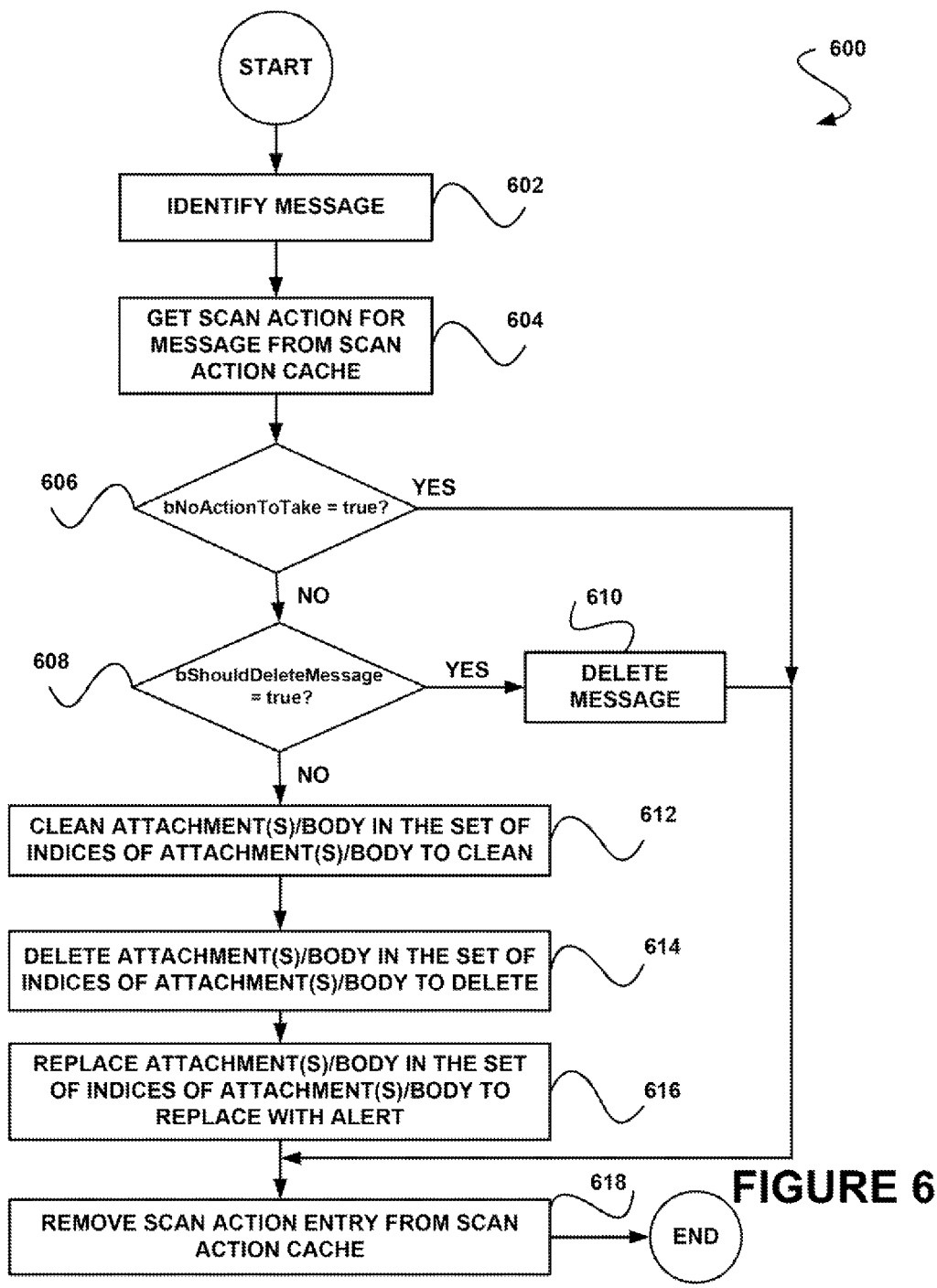
FIG. 6 shows a method for performing an action on a copy of a message, in accordance with still another embodiment.

FIG. 6 shows a method 600 for performing an action on a copy of a message, in accordance with another embodiment. As an option, the method 600 may be carried out in the context of the architecture and environment of FIGS. 1-5. Of course, however, the method 600 may be carried out in any desired environment. Again, it should also be noted that the aforementioned definitions may apply during the present description.

As shown in operation 602, a message is identified. As an option, the message may a copy of a message (e.g. a sent electronic mail message item, etc.). Additionally, in operation 604 a scan action is retrieved from a scan action cache. Optionally, the scan action may include the scan action structure of FIG. 5. For example, the scan action may be the result of a scanning of an outgoing electronic mail message associated with the message.

Additionally, in decision 606 it is determined whether the variable bNoActionToTake is set to true. If it is determined in decision 606 that the variable bNoActionToTake is set to true, in operation 618 a scan action entry is removed from the scan action cache. For example, the scan action entry may include the scan action structure. In this way, no action may be performed on the message.

However, if it is determined in decision 606 that the variable bNoActionToTake is not set to true, then in decision 608 it is determined whether the variable bShouldDeleteMessage is set to true. If it is determined in decision 608 that the variable bShouldDeleteMessage is set to trues then in operation 610 the message is deleted. Further, in response to operation 610, the scan action entry is removed from the scan action cache, as shown in operation 618.

Additionally, if it is determined in decision 608 that the variable bShouldDeleteMessage is not set to true, then in operation 612 any body and/or attachment having an ID in a set of indices of the body and/or attachments to be cleaned are cleaned. For example, a previous scan of a message may indicate that a body of the message is to be cleaned. Thus, an ID of the body may be stored in a scan index of the scan action structure of the message. To this end, prior to scanning a copy of the message, the ID of the body may be identified in the scan index of the scan action structure of the message. The body of the copy of the message may accordingly be cleaned without performing a scan on the copy of the message.

In another embodiment, the cleaned body or attachment may have been mapped to the body/attachment ID in the scan index of the scan action structure associated with the message. The cleaned body or attachment may replace the body or attachment of the copy of the message having the same ID, such that cleaning of the body or attachment of the copy of the message may be avoided.

Furthermore, in operation 614 any body and/or attachment having an ID in the set of indices of the body and/or attachments to be deleted in the scan action structure are deleted. For example, a previous scan of a message may indicate that one attachment was determined to be deleted, and the ID of such attachment may be stored in the scan index of the scan action structure of the message. Thus, when the copy of the message is scanned, the ID of an associated attachment may be found in the scan index of the scan action structure associated with the message. The attachment of the copy of the message may then be deleted without scanning the copy of the message.

Further still, in operation 616 any body and/or attachment having an ID in the set of indices of the body and/or attachments to be replaced with an alert in the scan action structure are replaced with the alert.

For example, a previous scan of a message may indicate that one attachment is to be replaced with the alert, such that the ID of the attachment may be stored in the scan index of the scan action of the message. In this way, when the copy of the message is scanned, the ID of the attachment may be found in the alert replacement index of the scan action structure associated with the message. The attachment of the copy of the message may then be replaced with the alert without scanning the copy of the message. Further, in response to operation 616, the scan action entry is removed from the scan action cache, as shown in operation 618.

In this way, one or more actions stored in the scan action entry for a message may be performed on a copy of the message without scanning the copy of the message, thereby preventing the scanning of the copy of the message after the message has been scanned.

In one exemplary embodiment, Lotus Domino® server may run as a suite of processes. For example, Lotus Domino® may run as a base server process, a simple mail transfer protocol (SMTP) process, an Internet message access protocol (IMAP) process, etc. Additionally, each server process may serve a particular request. For example, the SMTP process may cater to a client request for sending SMTP mails.

Additionally, when a user sends an electronic mail message through a Lotus Domino® server, the Lotus Domino® server may send the electronic mail message to the recipient. In addition, the Lotus Domino® server may save a copy of the electronic mail message in the user's mailbox as a sent message item.

Furthermore, a content security product may register with Lotus Domino® for any data updates occurring on the server. The content security product may run as a separate process from the other Lotus Domino® processes. Additionally, the content security product process may receive any data update callbacks from the Lotus Domino® server. The update callbacks may contain unique identifiers for an electronic mail message/sent message item on the server, which can be used to access the contents of the message for scanning.

Further still, when an electronic mail message travels across the Internet, a mail transfer agent may append its mail domain information to the electronic mail message. When the electronic mail message reaches its destination, it may contain a list of all the mail domains through which it has traveled. Lotus Domino® mail server may also add this domain information to the electronic mail message whether it travels across the internet or private networks before reaching the destination. If an electronic mail message does not have list of domains, the electronic mail message may be construed to be originating from the mail server. If the system is trying to scan a mail in server's mailbox and the electronic mail message does not have a header for domains through which it has traveled, the electronic mail message will be considered an outgoing electronic mail message and may be picked up for scanning optimization.

Additionally, Lotus Domino® mail servers may create a unique message ID for mails which are not routed through the Internet. The message ID may be used for keeping track of conversations and a read status of the message, for example. However, the message ID may be shared by an outgoing mail and the sent item. Therefore, the message ID for an outgoing electronic mail message may match a message ID of an associated sent message item.

Also, the outgoing electronic mail message and the sent message item may be generated on the mail server, and no other application may access the messages before the content security software scans at least one of such messages. Therefore, a match between the message ID of the electronic mail message and the sent message item may guarantee that their contents are the same.

Further, when a message needs to be scanned, a mapping table may be queried to obtain any scan actions corresponding to the message ID of the message. If the mapping table does not have the scan actions for the message ID, such may indicate that the message should be scanned. Once the scanning is completed, corresponding actions may be taken on the message. Additionally, an entry is added to a mapping table to store the scan results for the message ID.

However, if the mapping table already contains the corresponding scan actions for the message ID, the scan actions may be directly applied to the message without scanning the message. In addition, the corresponding entry may be removed from the mapping table after the scanning if the scan actions for the message ID are found.

Further, storing a copy of outgoing mail as a sent item in a user's mailbox may be configurable by a user. If the user opts to not store sent items, it may be ensured that may redundant entries are removed from the mapping table. This may be achieved by removing unused entries from the mapping table periodically.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining, using a processor provided in a client device, whether an identifier indicating a scan of a message is stored, wherein the identifier and a scan action associated with the identifier are stored in a same data structure separate from the message and the data structure includes a plurality of identifiers and associated scan actions from other previously sent and previously scanned messages, wherein the identifier includes at least a portion of a header of the message and one or more indices identifying scan actions for associated portions of the message that have already been scanned, wherein each indices is stored as a hash of a portion of the message that has already been scanned, and wherein the message is an electronic mail message sent from a first location over a network to a second location;
    preventing scanning of a copy of the message, based on the determination, that at least a portion of the message has already been scanned, wherein the portion of the message that has already been scanned is identified by a corresponding indices stored in the data structure;
    determining whether or not the copy of the message is to be deleted based on a parameter contained in the identifier;
    deleting the copy of the message in response to the parameter indicating that the copy of the message is to be deleted;
    retrieving a scan action from the data structure to identify an appropriate scan action for the portion of the message that has already been scanned, wherein the scan action includes cleaning, deleting, replacing, or quarantining; and wherein each portion of the message has an associated scan action;
    performing the cleaning, deleting, replacing or quarantining operation to the portion of the copy of the message represented by the corresponding indices based on the identified scan action; and
    removing the scan action indicating the at least one of the cleaning, the deleting, the replacing and the quarantining of the portion of the message from the data structure, wherein the data structure is a scan action cache.

2. The method of claim 1, wherein the copy of the message is a sent electronic mail message.

3. The method of claim 1, wherein the determination is responsive to a request to access, create, or update the copy of the message.

4. The method of claim 1, wherein the message is an outgoing electronic mail message.

5. The method of claim 1, wherein the identifier of the message is stored in the data structure, in response to a scan of the message.

6. The method of claim 1, wherein the data structure includes a cache.

7. The method of claim 1, further comprising applying a plurality of scan actions to the copy of the message.

8. The method of claim 1, wherein the scan action is a result of a scan of the message.

9. The method of claim 7, wherein the plurality of scan actions comprise one or more of:
    cleaning an attachment or body of the message;
    deleting the message;
    deleting an attachment or body of the message; and
    replacing an attachment or body of the message with an alert.

10. The method of claim 1, further comprising scanning the message and storing one or more actions of the scanning in another data structure.

11. The method of claim 1, further comprising scanning the copy of the message and storing one or more actions of the scanning in another data structure, in response to a determination that the identifier of the message is not stored in the data structure.

12. The method of claim 1, further comprising scanning at least one of a body of the message and an attachment of the message.

13. A computer program product embodied on a non-transitory computer readable medium for performing operations, comprising:
    determining, using a processor provided in a client device, whether an identifier indicating a scan of a message is stored, wherein the identifier and a scan action associated with the identifier are stored in a same data structure separate from the message and the data structure includes a plurality of identifiers and associated scan actions from other previously sent and previously scanned messages, wherein the identifier includes at least a portion of a header of the message and one or more indices identifying scan actions for associated portions of the message that have already been scanned, wherein each indices is stored as a hash of a portion of the message that has already been scanned, and wherein the message is an electronic mail message sent from a first location over a network to a second location;
    preventing scanning of a copy of the message, based on the determination, that at least a portion of the message has already been scanned, wherein the portion of the message that has already been scanned is identified by a corresponding indices stored in the data structure;
    determining whether or not the copy of the message is to be deleted based on a parameter contained in the identifier;

deleting the copy of the message in response to the parameter indicating that the copy of the message is to be deleted;

retrieving a scan action from the data structure to identify an appropriate scan action for the portion of the message that has already been scanned, wherein the scan action includes cleaning, deleting, replacing, or quarantining; and wherein each portion of the message has an associated scan action;

performing the cleaning, deleting, replacing or quarantining operation to the portion of the copy of the message represented by the corresponding indices based on the identified scan action; and removing the scan action indicating the at least one of the cleaning, the deleting, the replacing and the quarantining of the portion of the message from the data structure, wherein the data structure is a scan action cache.

14. A system, comprising:

a processor; and a memory coupled to the processor such that the system is configured for:

determining, using a processor provided in a client device, whether an identifier indicating a scan of a message is stored, wherein the identifier and a scan action associated with the identifier are stored in a same data structure separate from the message and the data structure includes a plurality of identifiers and associated scan actions from other previously sent and previously scanned messages, wherein the identifier includes at least a portion of a header of the message and one or more indices identifying scan actions for associated portions of the message that have already been scanned, wherein each indices is stored as a hash of a portion of the message that has already been scanned, and wherein the message is an electronic mail message sent from a first location over a network to a second location;

preventing scanning of a copy of the message, based on the determination, that at least a portion of the message has already been scanned, wherein the portion of the message that has already been scanned is identified by a corresponding indices stored in the data structure;

determining whether or not the copy of the message is to be deleted based on a parameter contained in the identifier;

deleting the copy of the message in response to the parameter indicating that the copy of the message is to be deleted;

retrieving a scan action from the data structure to identify an appropriate scan action for the portion of the message that has already been scanned, wherein the scan action includes cleaning, deleting, replacing, or quarantining; and wherein each portion of the message has an associated scan action;

performing the cleaning, deleting, replacing or quarantining operation to the portion of the copy of the message represented by the corresponding indices based on the identified scan action; and removing the scan action indicating the at least one of the cleaning, the deleting, the replacing and the quarantining of the portion of the message from the data structure, wherein the data structure is a scan action cache.

15. The system of claim 14, further comprising non-transitory computer readable memory coupled to the processor via a bus.

16. The system of claim 14, wherein the determining includes determining whether a portion of the identifier is stored in the data structure.

17. The system of claim 14, further comprising scanning at least one of a body of the message and an attachment of the message.

18. The computer program product of claim 13, wherein the determining includes determining whether a portion of the identifier is stored in the data structure.

19. The computer program product of claim 13, wherein the operations further comprise:

scanning at least one of a body of the message and an attachment of the message.

20. The method of claim 1, wherein the determining includes determining whether a portion of the identifier is stored in the data structure.

* * * * *